(12) United States Patent
Boardman et al.

(10) Patent No.: US 8,205,452 B2
(45) Date of Patent: Jun. 26, 2012

(54) APPARATUS FOR FUEL INJECTION IN A TURBINE ENGINE

(75) Inventors: Gregory Allen Boardman, Greer, SC (US); Patrick Benedict Melton, Horse Shoe, NC (US); Christine Elaine Simu, Greenville, SC (US)

(73) Assignee: General Electric Company, Schenectady, NY (US)

( * ) Notice: Subject to any disclaimer, the term of this patent is extended or adjusted under 35 U.S.C. 154(b) by 794 days.

(21) Appl. No.: 12/364,488

(22) Filed: Feb. 2, 2009

(65) Prior Publication Data
US 2010/0192579 A1 Aug. 5, 2010

(51) Int. Cl.
*F02C 1/00* (2006.01)
*F02C 7/08* (2006.01)

(52) U.S. Cl. ............................................ 60/737; 60/738

(58) Field of Classification Search .................... 60/737, 60/740, 742, 746, 747, 748, 738
See application file for complete search history.

(56) References Cited

U.S. PATENT DOCUMENTS

| 5,235,814 | A | * | 8/1993 | Leonard | 60/738 |
| 5,778,676 | A | * | 7/1998 | Joshi et al. | 60/746 |
| 6,427,446 | B1 | * | 8/2002 | Kraft et al. | 60/737 |
| 6,532,742 | B2 | | 3/2003 | Scarinci et al. | |
| 7,610,759 | B2 | * | 11/2009 | Yoshida et al. | 60/737 |
| 7,779,636 | B2 | * | 8/2010 | Buelow et al. | 60/742 |

* cited by examiner

*Primary Examiner* — Louis Casaregola
*Assistant Examiner* — Arun Goyal
(74) *Attorney, Agent, or Firm* — Fletcher Yoder P.C.

(57) ABSTRACT

In one embodiment, a system includes a fuel nozzle that includes a fuel injector configured to output a fuel flow and a premixer tube disposed about the fuel flow output from the fuel injector. The premixer tube includes a perforated portion and a non-perforated portion, and the non-perforated portion is downstream of the perforated portion.

20 Claims, 8 Drawing Sheets

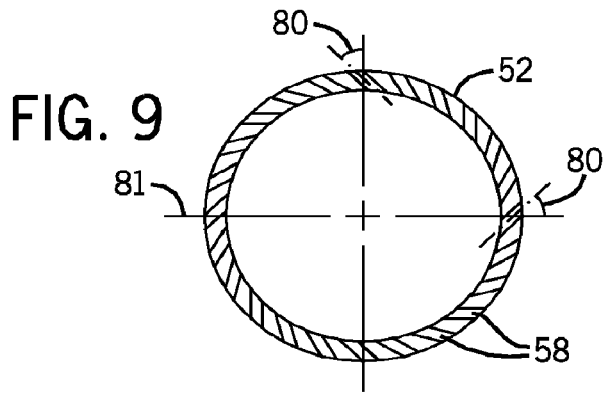
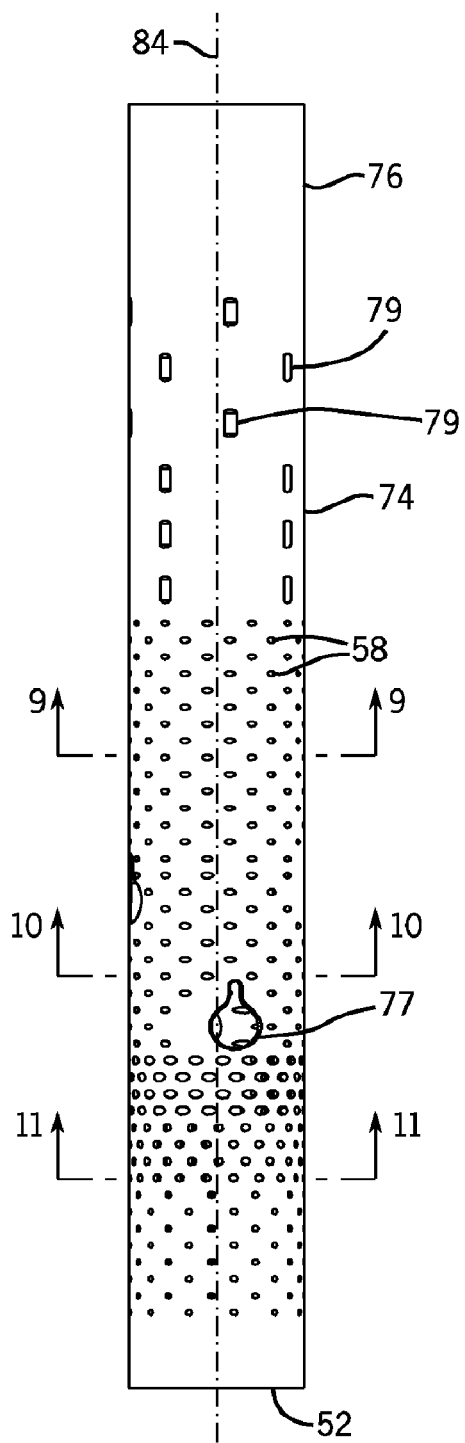
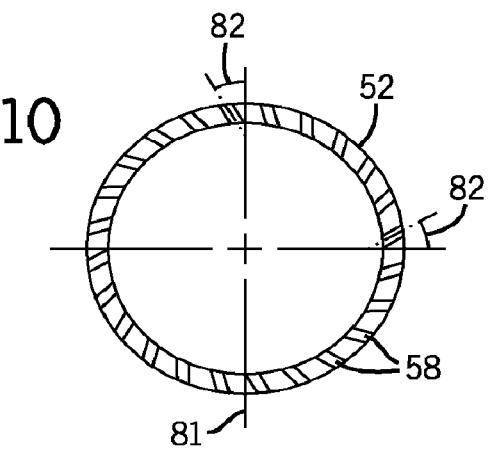
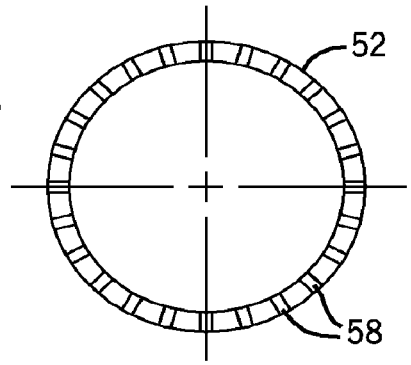

APPARATUS FOR FUEL INJECTION IN A TURBINE ENGINE

BACKGROUND OF THE INVENTION

The subject matter disclosed herein relates to a gas turbine engine and, more specifically, to a fuel nozzle.

Gas turbine engines include one or more combustors, which receive and combust compressed air and fuel to produce hot combustion gases. For example, the gas turbine engine may include multiple combustors positioned circumferentially around the rotational axis. Air and fuel pressures within each combustor may vary cyclically with time. These air and fuel pressure fluctuations may drive or cause pressure oscillations of the combustion gases at a particular frequency. If this frequency corresponds to a natural frequency of a part or subsystem within the turbine engine, then damage to that part or the entire engine may result.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a fuel nozzle that includes a fuel injector configured to output a fuel flow and a premixer tube disposed about the fuel flow output from the fuel injector. The premixer tube includes a perforated portion and a non-perforated portion, and the non-perforated portion is downstream of the perforated portion.

In a second embodiment, a system includes a fuel nozzle that includes a fuel injector configured to output a fuel flow and a perforated premixer tube. The perforated premixer tube includes perforations disposed about the fuel flow downstream of the fuel injector. The perforations are angled to facilitate airflow into the perforated premixer tube in a swirling motion, and a degree of swirl varies based on an axial position of the perforations along a length of the perforated premixer tube.

In a third embodiment, a system includes a fuel nozzle that includes multiple fuel injectors and multiple perforated premixer tubes. Each fuel injector outputs a flow of fuel in a downstream direction into a perforated premixer tube at an upstream portion of the perforated premixer tube. The fuel nozzle also includes a cap including multiple air windows leading to an internal cavity, where the perforated premixer tubes are disposed. The cap is configured to route air through the air windows, through the internal cavity around the perforated premixer tubes at least partially in an upstream direction from a downstream portion to the upstream portion of the perforated premixer tubes, and into the premixer tubes at the upstream portion. The upstream direction is generally opposite from the downstream direction of the flow of fuel.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 8 is a side view of a premixer tube, as shown in FIG. 7, in accordance with certain embodiments of the present technique;

FIG. 9 is a cross-sectional side view of a premixer tube, taken along line 9-9 of FIG. 8, in accordance with certain embodiments of the present technique;

FIG. 10 is a cross-sectional side view of a premixer tube, taken along line 10-10 of FIG. 8, in accordance with certain embodiments of the present technique; and FIG. 11 is a cross-sectional side view of a premixer tube, taken along line 11-11 of FIG. 8, in accordance with certain embodiments of the present technique.

DETAILED DESCRIPTION OF THE INVENTION

Figure 1:
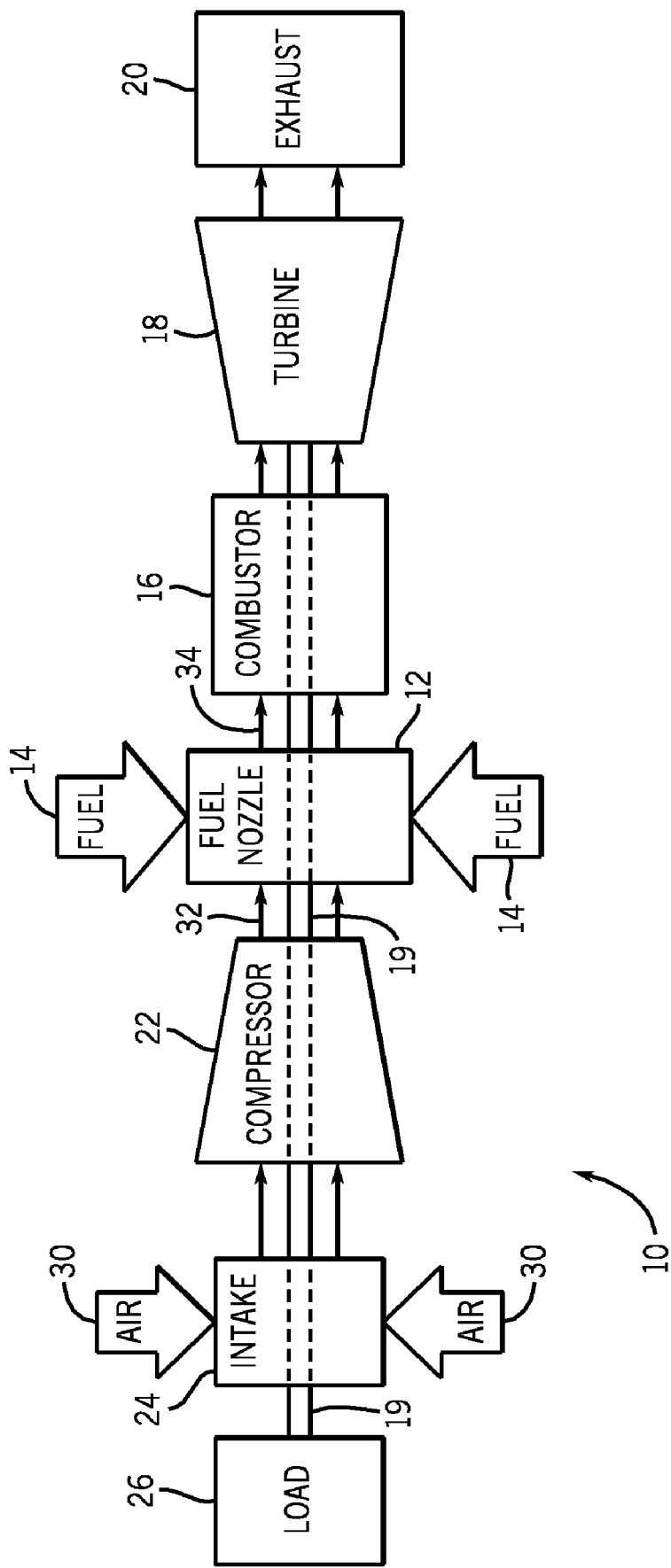
FIG. 1 is a block diagram of a turbine system having a fuel nozzle coupled to a combustor, wherein the fuel nozzle is configured to reduce pressure oscillations associated with the combustor in accordance with certain embodiments of the present technique.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may reduce combustor driven oscillations by spreading out (or smearing out) fuel-air mixing (in time and space) and increasing fuel and/or air residence times within a mixing portion of the combustor. Combustor driven oscillations may be defined as pressure oscillations in the combustor as the fuel and air enter, mix, and combust within the combustor. The combustor driven oscillations may cause pressure oscillations throughout the turbine system, and thus wear and potentially damage components both upstream and downstream of the combustor. As discussed in detail below, these combustor driven oscillations may be substantially reduced or minimized by reducing upstream pressure oscillations in the fuel and air supplied to the combustor. For example, the upstream pressure oscillations may be substantially reduced or minimized via unique pressure balancing features in the head end and/or fuel nozzles of the turbine engine. Accordingly, certain embodiments may increase residence time in each fuel nozzle by including one or more premixer tubes with perforations, e.g., a premixer tube with an extended length and/or a non-perforated portion downstream from a perforated portion. Some embodiments may induce swirl within the premixer tube, where the degree of swirl varies based on axial position of the perforations along the length of the premixer tube. Swirling the fuel-air mixture effectively improves mixing, improves diffuser pressure recovery at the nozzle outlet, improves flame stability at the nozzle outlet, and extends the path length through the premixer tube, thereby increasing residence time. Some embodiments may employ multiple premixer tubes within a mini-nozzle cap, where air is directed across the back of the cap to provide cooling before the air enters the premixer tubes.

Turning now to the drawings and referring first to FIG. 1, a block diagram of an embodiment of a gas turbine system 10 is illustrated. The diagram includes fuel nozzle 12, fuel supply 14, and combustor 16. As depicted, fuel supply 14 routes a liquid fuel and/or gas fuel, such as natural gas, to the turbine system 10 through fuel nozzle 12 into combustor 16. As discussed below, the fuel nozzle 12 is configured to inject and mix the fuel with compressed air while minimizing combustor driven oscillations. The combustor 16 ignites and combusts the fuel-air mixture, and then passes hot pressurized exhaust gas into a turbine 18. The exhaust gas passes through turbine blades in the turbine 18, thereby driving the turbine 18 to rotate. In turn, the coupling between blades in turbine 18 and shaft 19 will cause the rotation of shaft 19, which is also coupled to several components throughout the turbine system 10, as illustrated. Eventually, the exhaust of the combustion process may exit the turbine system 10 via exhaust outlet 20.

In an embodiment of turbine system 10, compressor vanes or blades are included as components of compressor 22. Blades within compressor 22 may be coupled to shaft 19, and will rotate as shaft 19 is driven to rotate by turbine 18. Compressor 22 may intake air to turbine system 10 via air intake 24. Further, shaft 19 may be coupled to load 26, which may be powered via rotation of shaft 19. As appreciated, load 26 may be any suitable device that may generate power via the rotational output of turbine system 10, such as a power generation plant or an external mechanical load. For example, load 26 may include an electrical generator, a propeller of an airplane, and so forth. Air intake 24 draws air 30 into turbine system 10 via a suitable mechanism, such as a cold air intake, for subsequent mixture of air 30 with fuel supply 14 via fuel nozzle 12. As will be discussed in detail below, air 30 taken in by turbine system 10 may be fed and compressed into pressurized air by rotating blades within compressor 22. The pressurized air may then be fed into fuel nozzle 12, as shown by arrow 32. Fuel nozzle 12 may then mix the pressurized air and fuel, shown by numeral 34, to produce a suitable mixture ratio for combustion, e.g., a combustion that causes the fuel to more completely burn, so as not to waste fuel or cause excess emissions. An embodiment of turbine system 10 includes certain structures and components within fuel nozzle 12 to reduce combustor driven oscillations, thereby increasing performance and reducing emissions.

Figure 2:
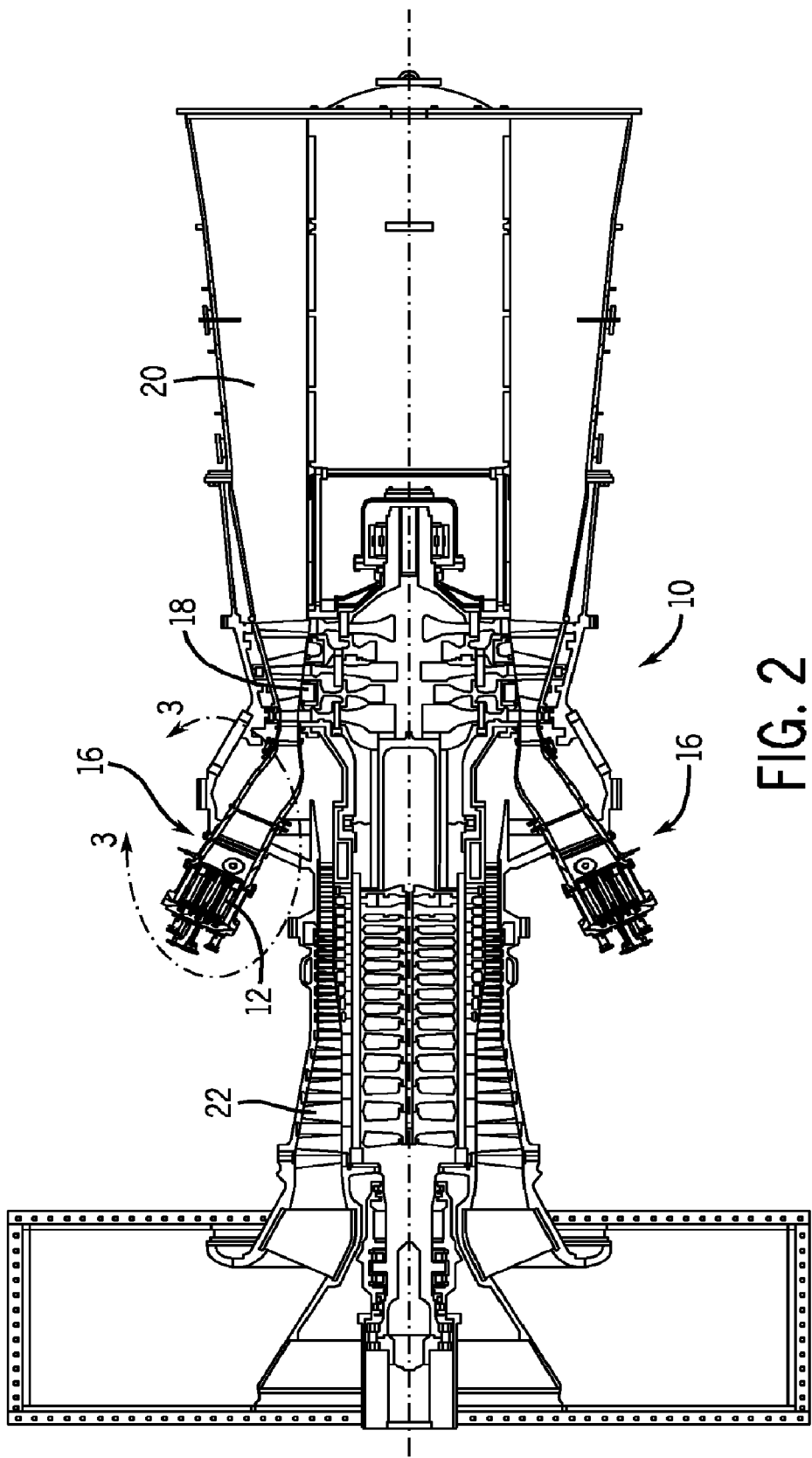
FIG. 2 is a cutaway side view of the turbine system, as shown in FIG. 1, in accordance with certain embodiments of the present technique.

FIG. 2 shows a cutaway side view of an embodiment of turbine system 10. As depicted, the embodiment includes compressor 22, which is coupled to an annular array of combustors 16, e.g., six, eight, ten, or twelve combustors 16. Each combustor 16 includes at least one fuel nozzle 12 (e.g., 1, 2, 3, 4, 5, 6, 7, 8, 9, 10, or more), which feeds an air-fuel mixture to a combustion zone located within each combustor 16. Combustion of the air-fuel mixture within combustors 16 will cause vanes or blades within turbine 18 to rotate as exhaust gas passes toward exhaust outlet 20. As will be discussed in detail below, certain embodiments of fuel nozzle 12 include a variety of unique features to reduce combustor driven oscillations, thereby improving combustion, reducing undesirable exhaust emissions, and improving fuel consumption.

Figure 3:
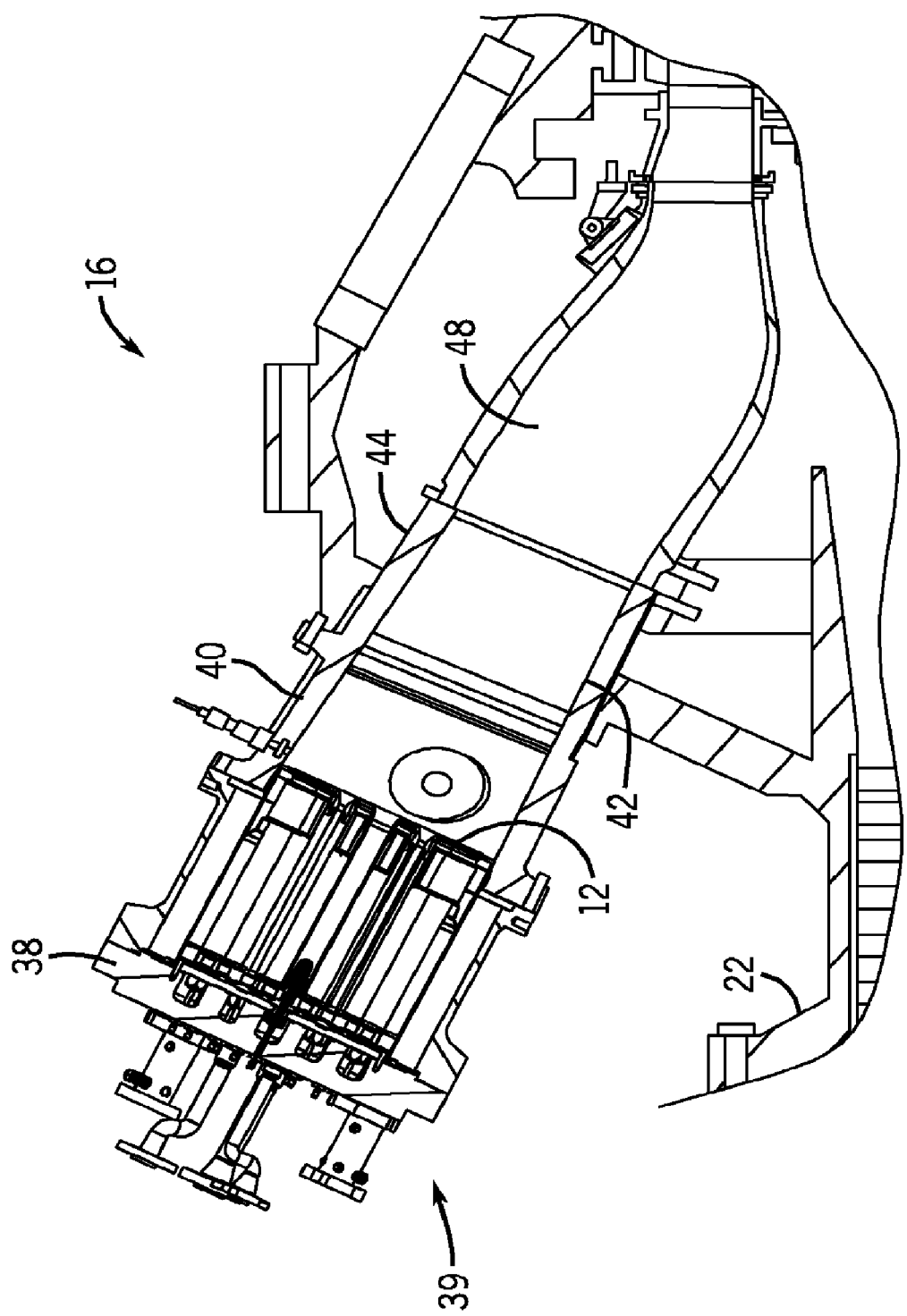
FIG. 3 is a cutaway side view of the combustor, as shown in FIG. 1, with a fuel nozzle coupled to an end cover of the combustor in accordance with certain embodiments of the present technique.

A detailed view of an embodiment of combustor 16, as shown in FIG. 2, is illustrated in FIG. 3. In the diagram, fuel nozzle 12 is attached to end cover 38 at a base or head end 39 of combustor 16. Compressed air and fuel are directed through end cover 38 to the fuel nozzle 12, which distributes an air-fuel mixture into combustor 16. The fuel nozzle 12 receives compressed air from the compressor 22 via a flow path around and partially through the combustor 16 from a downstream end to an upstream end (e.g., head end 39) of the combustor 16. In particular, the turbine system 10 includes a casing 40, which surrounds a liner 42 and flow sleeve 44 of the combustor 16. The compressed air passes between the casing 40 and the combustor 16 until it reaches the flow sleeve 44. Upon reaching the flow sleeve 44, the compressed air passes through perforations in the flow sleeve 44, enters a hollow annular space between the flow sleeve 44 and liner 42, and flows upstream toward the head end 39. In this manner, the compressed air effectively cools the combustor 16 prior to mixing with fuel for combustion. Upon reaching the head end 39, the compressed air flows into the fuel nozzle 12 for mixing with the fuel. In turn, the fuel nozzle 12 may distribute a pressurized air-fuel mixture into combustor 16, wherein combustion of the mixture occurs. The resultant exhaust gas flows through transition piece 48 to turbine 18, causing blades of turbine 18 to rotate, along with shaft 19. In general, the air-fuel mixture combusts downstream of the fuel nozzle 12 within combustor 16. Mixing of the air and fuel streams may depend on properties of each stream, such as fuel heating value, flow rates, and temperature. In particular, the pressurized air may be at a temperature, around 650-900° F. and fuel may be around 70-500° F. As discussed in detail below, the fuel nozzle 12 includes various features to reduce pressure oscillations or variations in the air and/or fuel flows prior to injection into the combustor 16, thereby substantially reducing combustor driven oscillations.

Figure 4:
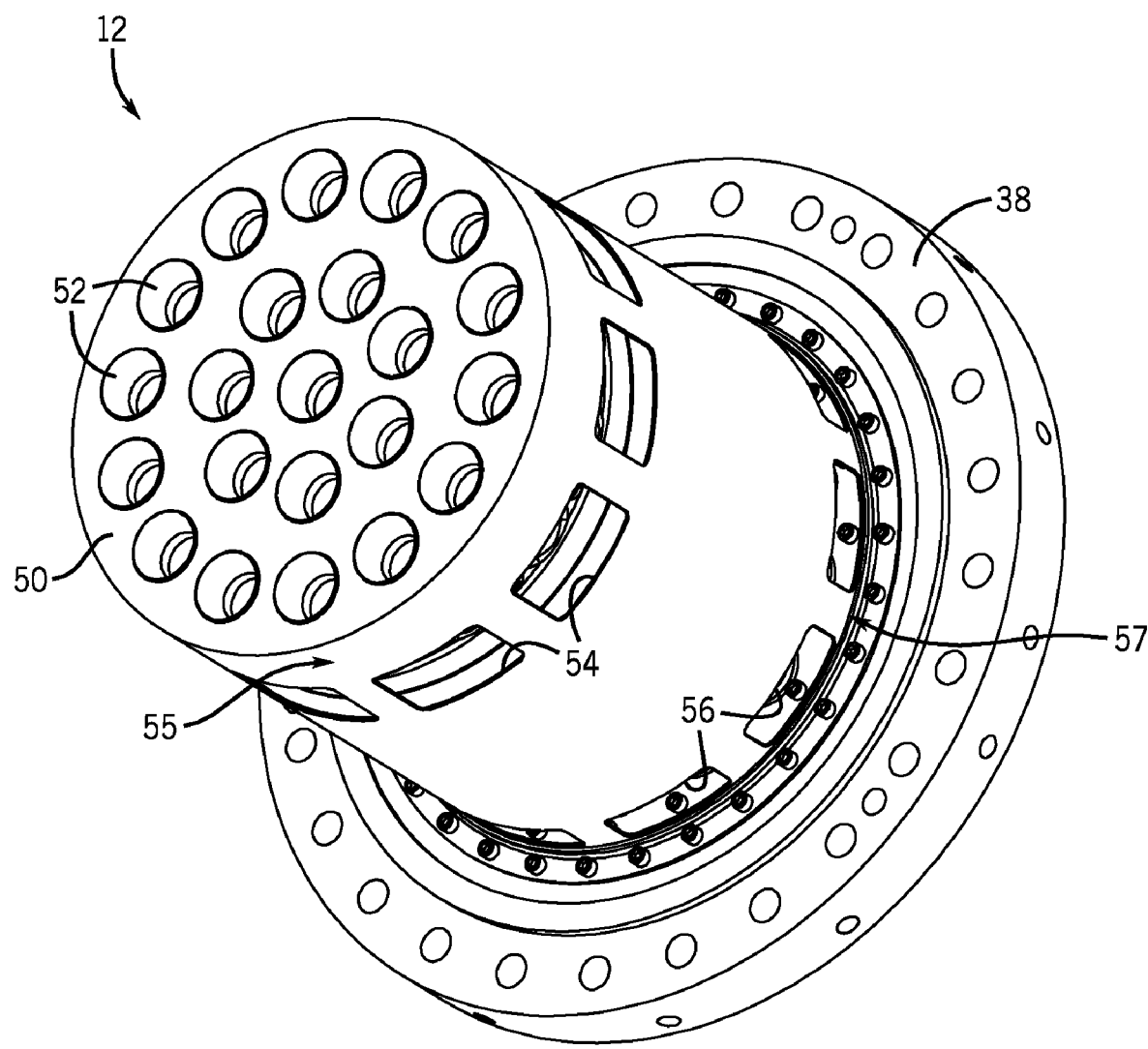
FIG. 4 is a perspective view of the fuel nozzle, as shown in FIG. 3, with a set of premixer tubes in accordance with certain embodiments of the present technique.

FIG. 4 shows a perspective view of a fuel nozzle 12 that may be used in the combustor 16 of FIG. 3. The fuel nozzle 12 includes a mini-nozzle cap 50 with multiple premixer tubes 52. First windows 54 may be position around the circumference of the mini-nozzle cap 50 to facilitate airflow into the cap 50 near a downstream portion 55 of the cap 50. Second windows 56 may also be located around the circumference of the mini-nozzle cap 50 closer to the end cover 38 to provide additional airflow near an upstream portion 57 of the cap 50. However, as discussed in further detail below, fuel nozzle 12 may be configured to direct airflow from both windows 54 and 56 into the premixer tubes 52 in a greater amount at the upstream portion 57 rather than the downstream portion 55. The number of first windows 54 and second windows 56 may vary based on desired airflow into the mini-nozzle cap 50. For example, the first and second windows 54 and 56 each may include a set of approximately 2, 4, 6, 8, 10, 12, 14, 16, 18, or 20 windows distributed about the circumference of the mini-nozzle cap 50. However, the size and shape of these windows may be configured to conform to particular combustor 16 design considerations. The mini-nozzle cap 50 may be secured to the end cover 38, forming a complete fuel nozzle assembly 12.

As will be discussed in detail below, fuel and air may mix within the premixer tubes 52 in a manner reducing pressure oscillations prior to injection into the combustor 16. Air from the windows 54 and 56 may flow into the premixer tubes 52 and combine with fuel flowing through the end cover 38. The fuel and air may mix as they travel along the length of the premixer tubes 52. For example, each premixer tube 52 may include an increased length, angled perforations to induce swirl, and/or a non-perforated section downstream from a perforated section. These features may substantially increase residence time of the fuel and air and dampen pressure oscillations within the premixer tube 52. Upon exiting the tubes 52, the fuel-air mixture may be ignited, generating hot gas which powers the turbine 18.

Figure 5:
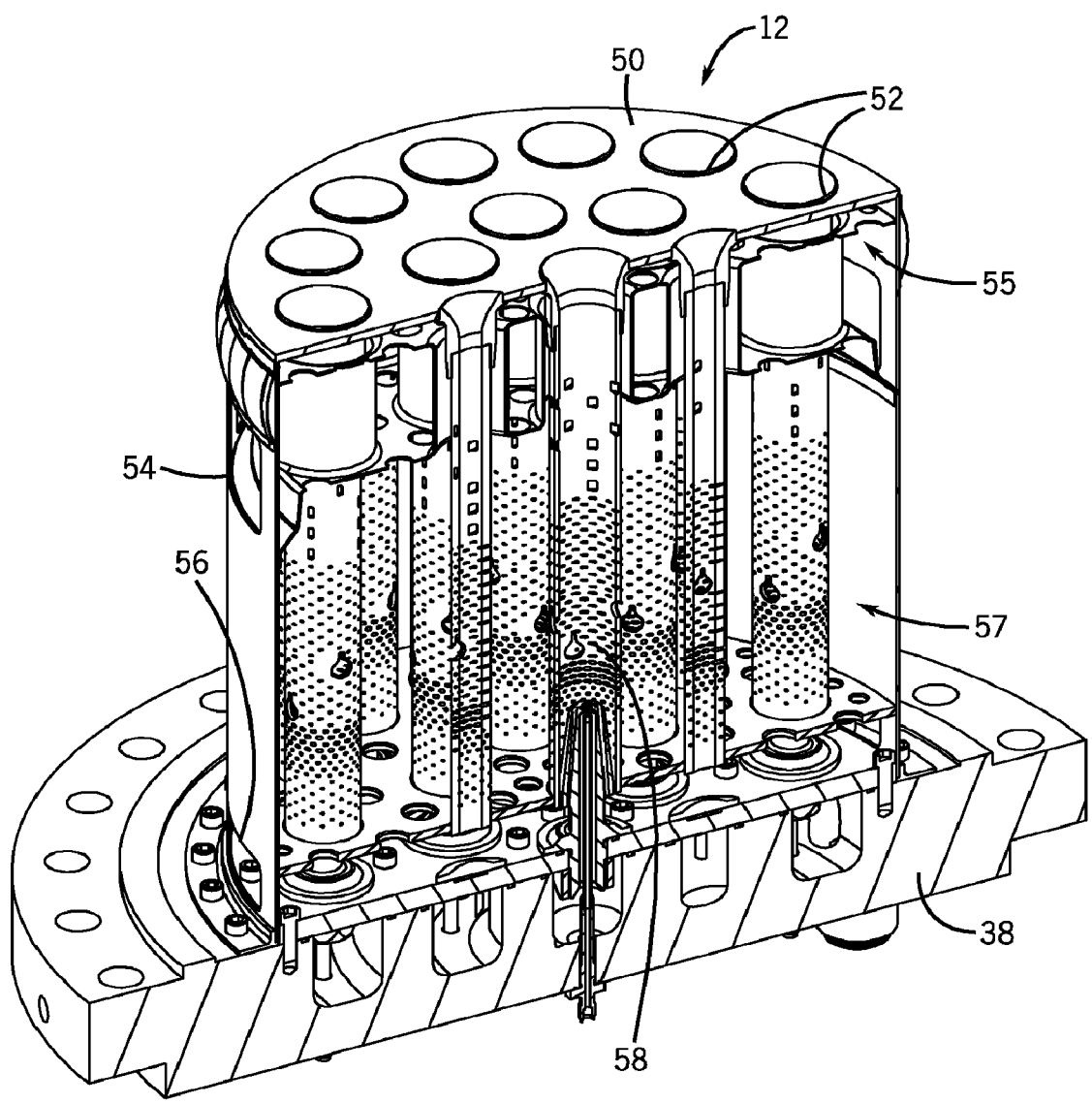
FIG. 5 is a cutaway perspective view of the fuel nozzle, as shown in FIG. 4, in accordance with certain embodiments of the present technique.

FIG. 5 presents a cross-section of the fuel nozzle 12 depicted in FIG. 4. This cross-section shows the premixer tubes 52 within the mini-nozzle cap 50. As can be seen in FIG. 5, each premixer tube 52 contains multiple perforations 58 along the longitudinal axis of the tube 52. These perforations 58 direct air from the windows 54 and 56 into the premixer tubes 52. The number of perforations and the size of each perforation may vary based on desired airflow into each premixer tube 52. Fuel may be injected through the end cover 38 and mix with the air entering through the perforations 58. Again, the position, orientation, and general arrangement of the perforations 58 may be configured to substantially increase residence time and dampen pressure oscillations in the fuel and air, thereby in turn substantially reducing oscillations in the combustion process occurring within the combustor 16 downstream from the fuel nozzle 12. For example, the percentage of perforations 58 may be higher in the upstream portion 57 rather than the downstream portion 55 of each premixer tube 52. Air entering through perforations 58 further upstream 57 travels a greater distance through the premixer tube 52, whereas air entering through perforations 58 further downstream 55 travels a shorter distance through the premixer tube 52. In certain embodiments, the perforations 58 may be sized relatively larger in the upstream portion 57 and relatively smaller in the downstream portion 55 of the premixer tube 52, or vice versa. For example, larger perforations 58 in the upstream portion 57 may result in a greater percentage of air flow entering through the upstream portion 57 of the premixer tube 52, which in turn leads to greater residence time in the premixer tube 52. In some embodiments, the perforations 58 may be angled to induce swirl to increase mixing, increase residence time, and dampen pressure oscillations in the air and fuel flows through the premixer tube 52. Eventually, after substantial dampening of the pressure oscillations in the fuel and air flows, the premixer tube 52 injects the fuel-air mixture into the combustor 16 for combustion.

Figure 6:
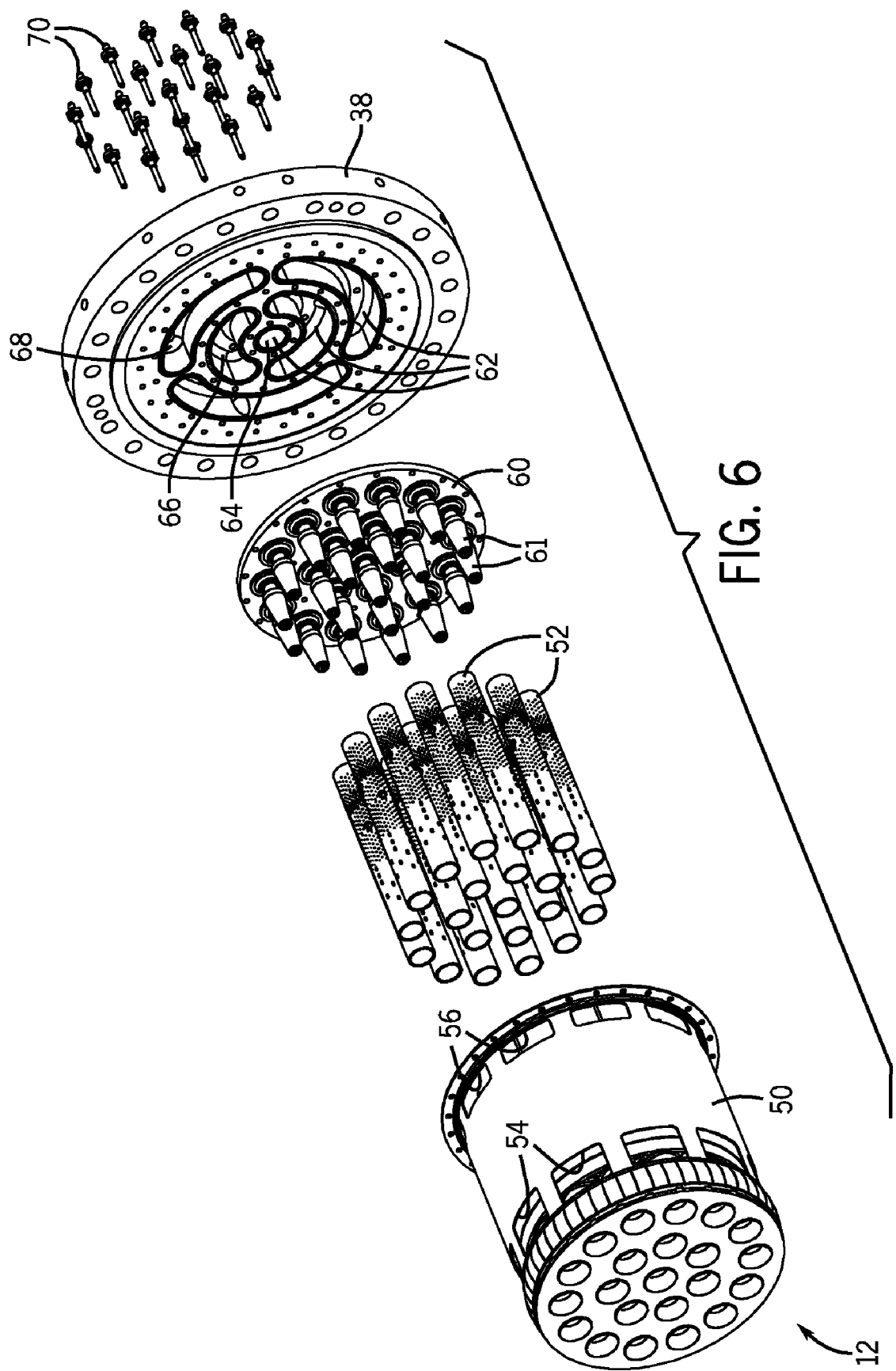
FIG. 6 is an exploded perspective view of the fuel nozzle, as shown in FIG. 4, in accordance with certain embodiments of the present technique.

FIG. 6 is an exploded view of the fuel nozzle 12 depicted in FIG. 4. This figure further shows the configuration of premixer tubes 52 within the mini-nozzle cap 50. FIG. 6 also presents another perspective of the first windows 54 and the second windows 56. In addition, this figure illustrates the paths and structures for fuel supply into the base of each premixer tube 52.

Turbine engines may operate on liquid fuel, gaseous fuel, or a combination of the two. The fuel nozzle 12 presented in FIG. 6 facilitates both liquid and gaseous fuel flow into the premixer tubes 52. However, other embodiments may be configured to operate solely on liquid fuel or gaseous fuel. The gaseous fuel may enter the premixer tubes 52 through a gas injector plate 60. This plate 60, as shown, contains multiple cone-shaped orifices 61 that supply gas to the premixer tubes 52. Gas may be supplied to the gas injector plate 60 through the end cover 38. The end cover 38 may include multiple galleries 62 (e.g., annular or arcuate shaped recess) that direct gas from a fuel supply 14 to the gas injector plate 60. The illustrated embodiment includes three galleries 62, e.g., first gallery 64, second gallery 66, and third gallery 68. Second gallery 66 and third gallery 68 are divided into multiple sections. However, continuous annular galleries 66 and 68 may be employed in alternative embodiments. The number of galleries may vary based on the configuration of the fuel nozzle 12. As can be seen in this figure, the gas orifices 61 are arranged in two concentric circles surrounding a central orifice 61. In this configuration, the first gallery 64 may supply gas to the central orifice 61, the second gallery 66 may supply gas to the inner circle of orifices 61, and the third gallery 68 may supply gas to the outer circle of orifices 61. In this manner, gaseous fuel may be supplied to each premixer tube 52.

Liquid fuel may be supplied to the premixer tubes 52 through multiple liquid atomizer sticks or liquid fuel cartridges 70. Each liquid fuel cartridge 70 may pass through the end cover 38 and the gas injector plate 60. As will be discussed below, the tip of each liquid fuel cartridge 70 may be located within each gas orifice 61. In this configuration, both liquid and gaseous fuel may enter the premixer tubes 52. For example, the liquid fuel cartridges 70 may inject an atomized liquid fuel into each premixer tube 52. This atomized liquid may combine with the injected gas and the air within the premixer tubes 52. The mixture may then be ignited as it exits the fuel nozzle 12. Furthermore, each liquid fuel cartridge 70 may include a fluid coolant (e.g., water) passage to inject a liquid spray (e.g., water spray) into the premixer tube 52. In certain embodiments, the unique features of the premixer tubes 52 may substantially reduce pressure fluctuations in fluid supplies including air, gas fuel, liquid fuel, liquid coolant (e.g., water), or any combination thereof. For example, the perforations 58 in the premixer tubes 52 may be configured to impinge the gas fuel, liquid fuel, and/or liquid coolant (e.g., water) in a manner increasing mixing, increasing residence time, and dampening pressure oscillations prior to injection of the mixture into the combustor 16.

Figure 7:
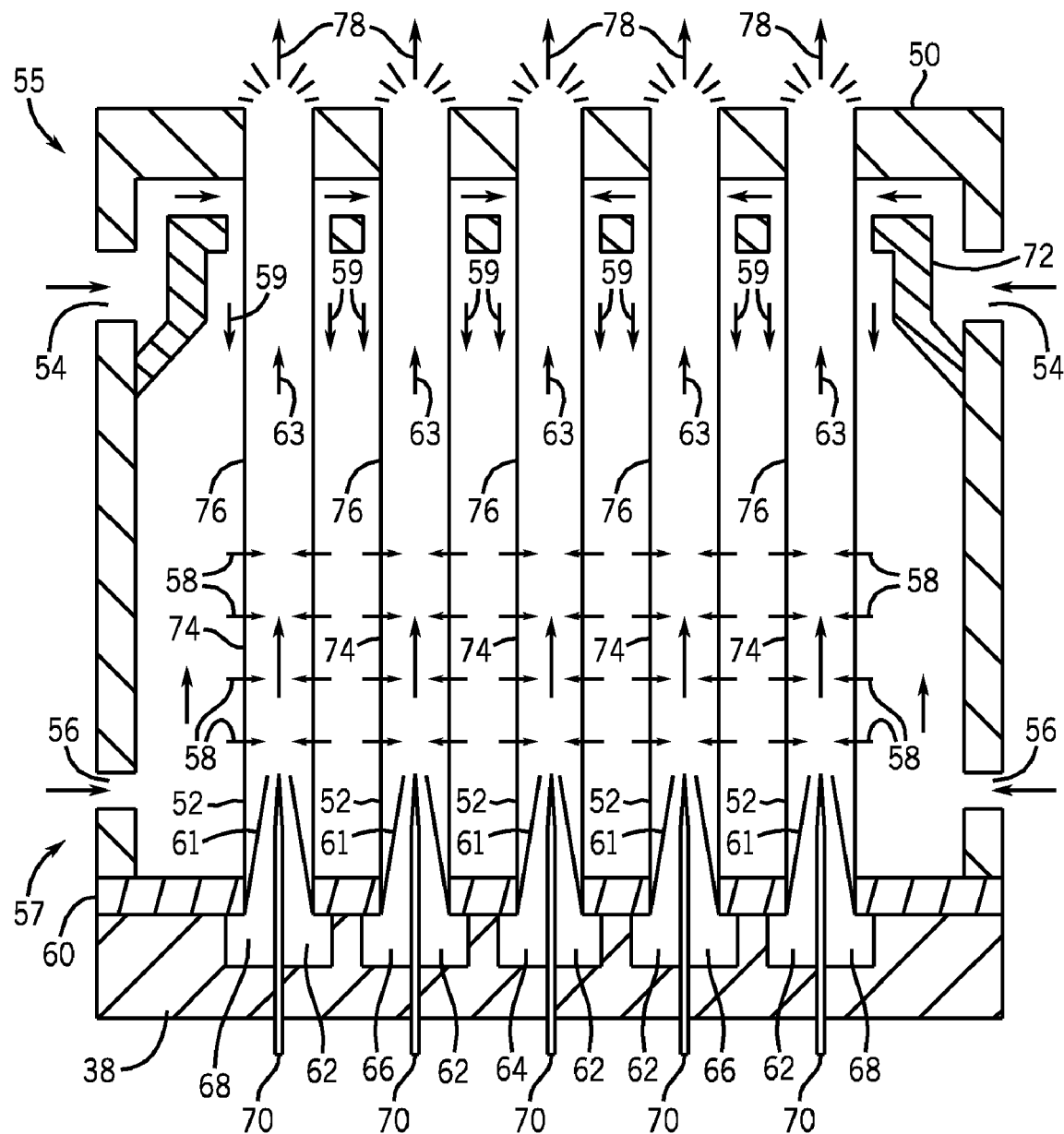
FIG. 7 is a cross-sectional side view of the fuel nozzle, as shown in FIG. 4, in accordance with certain embodiments of the present technique.

FIG. 7 shows a cross-section of the fuel nozzle 12 depicted in FIG. 4. As previously discussed, air may enter the mini-nozzle cap 50 through first windows 54 and second windows 56. This figure shows the path of air through the windows 54 and 56 to the perforations 58, through the perforations 58, and lengthwise along the premixer tubes 52. The first windows 54 direct air into the downstream portion 55 of the mini-nozzle cap 50 to facilitate cooling before the air passes into the premixer tubes 52 at the upstream portion 57. In other words, the air flow passes along an exterior of the premixer tubes 52 in an upstream direction 59 from the downstream portion 55 to the upstream portion 57 prior to passing through the perforations 58 into the premixer tubes 52. In this manner, the air flow 59 substantially cools the fuel nozzle 12, and particularly the premixer tubes 52, with greater effectiveness in the downstream portion 55 nearest the hot products of combustion in the combustor 16. The second windows 56 facilitate airflow into premixer tubes 52 more closely or directly into the perforations 58 at the upstream portion 57 of the premixer tubes 52. Only two first windows 54 and second windows 56 are represented in FIG. 7. However, as best seen in FIG. 4, these windows 54 and 56 may be arranged along the entire circumference of the mini-nozzle cap 50.

Air entering the first windows 54 may be directed to the downstream portion 55 of the mini-nozzle cap 50 by a guide or cooling plate 72. As can be seen in FIG. 7, the fuel nozzle 12 distributes the air flow from the first windows 54 both crosswise and parallel to the longitudinal axis of the fuel nozzle 12, e.g., distributing the air flow crosswise about all of the premixer tubes 52 and lengthwise in the upstream direction 59 toward the perforations 58. The air flow 59 from the windows 54 eventually combines with air flow from the windows 56 as the air flows pass through perforations 58 in the premixer tubes 52. As noted above, the air flow 59 from windows 54 substantially cools the fuel nozzle 12 in the downstream portion 55. Thus, due to the hot products of combustion near the downstream portion 55, the air flow 59 from the windows 54 may be approximately 50° F. to 100° F. warmer than air flow from the second windows 56. Therefore, mixing the air from each source may help reduce air temperature entering the premixer tubes 52.

The first windows 54 in the present embodiment are approximately twice as large as the second windows 56. This configuration may ensure that the back side of the mini-nozzle cap 50 is sufficiently cooled, while reducing the air temperature entering the premixer tubes 52. However, window size ratio may vary based on the particular design considerations of the fuel nozzle 12. Furthermore, additional sets of windows may be employed in other embodiments.

The combined air flows enter the premixer tubes 52 through perforations 58 (shown with arrows) located along a perforated section 74 of the tubes 52. As previously discussed, fuel injectors may inject gas fuel, liquid fuel, liquid coolant (e.g., water), or a combination thereof, into the premixer tubes 52. The configuration illustrated in FIG. 7 injects both gas and liquid fuels. Gas may be provided by the galleries 62 located directly below the injector plate 60 in the end cover 38. The same three-gallery configuration presented in FIG. 6 is employed in this embodiment. The first gallery 64 is located below the center premixer tube 52. The second gallery 66 surrounds the first gallery 64 in a coaxial or concentric arrangement, and provides gas to the next outer premixer tubes 52. The third gallery 68 surrounds the second gallery 66 in a coaxial or concentric arrangement, and provides gas to the outer premixer tubes 52. Gas may be injected into the premixer tubes 52 through gas orifices 61. Similarly, liquid may be injected by liquid fuel cartridges 70. The liquid fuel cartridges 70 may inject liquid fuel (and also optional liquid coolant) at a pressure sufficient to induce atomization, or the formation of liquid fuel droplets. The liquid fuel may combine with the gaseous fuel and the air within the perforated section 74 of the premixer tubes 52. Additional mixing of the fuel and air may continue in a non-perforated section 76 downstream from the perforated section 74.

The combination of these two sections 74 and 76 may ensure that sufficient mixing of fuel and air occurs prior to combustion. For example, the non-perforated section 76 forces the air flow 59 to flow further upstream to the upstream portion 57, thereby increasing the flow path and residence time of all air flows passing through the premixer tubes 52. At the upstream portion 57, the air flows from both the downstream windows 54 and the upstream windows 56 pass through the perforations 58 in the perforated section 74, and then travel in a downstream direction 63 through the premixer tubes 52 until exiting into the combustor 16. Again, the exclusion of perforations 58 in the non-perforated section 76 is configured to increase residence time of the air flows in the premixer tubes 52, as the non-perforated section 76 essentially blocks entry of the airflows into the premixer tubes 52 and guides the airflows to the perforations 58 in the upstream perforated section 74. Furthermore, the upstream positioning of the perforations 58 enhances fuel-air mixing further upstream 57, thereby providing greater time for the fuel and air to mix prior to injection into the combustor 16. Likewise, the upstream positioning of the perforations 58 substantially reduces pressure oscillations in the fluid flows (e.g., air flow, gas flow, liquid fuel flow, and liquid coolant flow), as the perforations create crosswise flows to enhance mixing with greater residence time to even out the pressure.

The gaseous fuel flowing through the galleries 62 may also serve to insulate the liquid fuel cartridges 70 and ensure that liquid fuel temperature remains low enough to reduce the possibility of coking. Coking is a condition where fuel begins to crack, forming carbon particles. These particles may become attached to inside walls of the liquid fuel cartridges 70. Over time, the particles may detach from the walls and clog the tip of the liquid fuel cartridge 70. The temperature at which coking occurs varies depending on the fuel. However, for typical liquid fuels, coking may occur at temperatures of greater than approximately 200, 220, 240, 260, or 280° F. As can be seen in FIG. 7, the liquid fuel cartridges 70 are disposed within the galleries 62 and gas orifices 61. Therefore, the liquid fuel cartridges 70 may be completely surrounded by flowing gas. This gas may serve to keep the liquid fuel within the liquid fuel cartridges 70 cool, reducing the possibility of coking.

After the fuel and air have properly mixed in the premixer tubes 52, the mixture may be ignited, resulting in a flame 78 downstream from the downstream portion 55 of each premixer tube 52. As discussed above, the flame 78 heats the fuel-nozzle 12 due to the relatively close location to the downstream portion 55 of the mini-nozzle cap 50. Therefore, as previously discussed, air from the first windows 54 flows through the downstream portion 55 of the mini-nozzle cap 50 to substantially cool the cap 50 of the fuel nozzle 12.

The number of premixer tubes 52 in operation may vary based on desired turbine system output. For example, during normal operation, every premixer tube 52 within the mini-nozzle cap 50 may operate to provide adequate mixing of fuel and air for a particular turbine power level. However, when the turbine system 10 enters a turndown mode of operation, the number of functioning premixer tubes 52 may decrease. When a turbine engine enters turndown, or low power operation, fuel flow to the combustors 16 may decrease to the point where the flame 78 is extinguished. Similarly, under low load conditions, the temperature of the flame 78 may decrease, resulting in increased emissions of oxides of nitrogen (NOx) and carbon monoxide (CO). To maintain the flame 78 and ensure that the turbine system 10 operates within acceptable emissions limits, the number of premixer tubes 52 operating within a fuel nozzle 12 may decrease. For example, the outer ring of premixer tubes 52 may be deactivated by interrupting fuel flow to the outer liquid fuel cartridges 70. Similarly, the flow of gaseous fuel to the third gallery 68 may be interrupted. In this manner, the number of premixer tubes 52 in operation may be reduced. As a result, the flame 78 generated by the remaining premixer tubes 52 may be maintained at a sufficient temperature to ensure that it is not extinguished and emission levels are within acceptable parameters.

In addition, the number of premixer tubes 52 within each mini-nozzle cap 50 may vary based on turbine system 10 design considerations. For example, larger turbine systems 10 may employ a greater number of premixer tubes 52 within each fuel nozzle 12. While the number of premixer tubes 52 may vary, the size and shape of the mini-nozzle cap 50 may be the same for each application. In other words, turbine systems 10 that use higher fuel flow rates may employ mini-nozzle caps 50 with a higher density of premixer tubes 52. In this manner, turbine system 10 construction costs may be reduced because a common mini-nozzle cap 50 may be used for most turbine systems 10, while the number of premixer tubes 52 within each cap 50 may vary. This manufacturing method may be less expensive than designing unique fuel nozzles 12 for each application.

FIG. 8 is a side view of a premixer tube 52 that may be used in the fuel nozzle 12 of FIG. 4. As can be seen in FIG. 8, the premixer tube 52 is divided into the perforated section 74 and the non-perforated section 76. In the illustrated embodiment, the perforated section 74 is positioned upstream of the non-perforated section 76. In this configuration, air flowing into the perforations 58 may mix with fuel entering through the base of the premixer tube 52 via a fuel injector (not shown). The mixing fuel and air may then pass into the non-perforated portion 76, where additional mixing may occur.

Air and fuel pressures typically fluctuate within a gas turbine engine. These fluctuations may drive a combustor oscillation at a particular frequency. If this frequency corresponds to a natural frequency of a part or subsystem within the turbine engine, damage to that part or the entire engine may result. Increasing the residence time of air and fuel within the mixing portion of the combustor 16 may reduce combustor driven oscillations. For example, if air pressure fluctuates with time, longer fuel droplet residence time may allow air pressure fluctuations to average out. Specifically, if the droplet experiences at least one complete cycle of air pressure fluctuation before combustion, the mixture ratio of that droplet may be substantially similar to other droplets in the fuel stream. Maintaining a substantially constant mixture ratio may reduce combustor driven oscillations.

Residence time may be increased by increasing the length of the mixing portion of the combustor 16. In the present embodiment, the mixing portion of the combustor 16 corresponds to the premixer tubes 52. Therefore, the longer the premixer tubes 52, the greater residence time for both air and fuel. For example, the length to diameter ratio of each tube 52 may be at least greater than approximately 5, 10, 15, 20, 25, 30, 35, 40, 45, or 50.

The non-perforated section 76 may serve to increase premixer tube 52 length without allowing additional air to mix with the fuel. In this configuration, the air and fuel may continue to mix after the air has been injected through the perforations 58 and, thus, reduce combustor driven oscillations. In certain embodiments, the length of the perforated section 74 relative to the length of the non-perforated section 76 may be at least greater than approximately 1.5, 2, 2.5, 3, 3.5, 4, 4.5, 5, 5.5, 6, 6.5, 7, 7.5, 8, 8.5, 9, 9.5, or 10, or vice versa. In one embodiment, the length of the perforated section 74 may be approximately 80% of the premixer tube 52 length, while the length of the non-perforated section 76 may be approximately 20% of the tube 52 length. However, the length ratios or percentages between these sections 74 and 76 may vary depending on flow rates and other design considerations. For example, each non-perforated section 76 may have a length ranging from about 15% to 35% of the premixer tube 52 length to increase mixing time and reduce combustor driven oscillations.

Residence time may also be increased by extending the effective path length of fluid flows (e.g., fuel droplets) through the premixer tubes 52. Specifically, air may be injected into the premixer tubes 52 in a swirling motion. This swirling motion may induce the droplets to travel through the premixer tubes 52 along a non-linear path (e.g., a random path or a helical path), thereby effectively increasing droplet path length. The amount of swirl may vary based on desired residence time.

Radial inflow swirling may also serve to keep liquid fuel droplets off the inner walls of the premixer tubes 52. If the liquid droplets become attached to the walls, they may remain in the tubes 52 for a longer period of time, delaying combustion. Therefore, ensuring that droplets properly exit the premixer tubes 52 may increase efficiency of the turbine system 10.

In addition, swirling air within the premixer tubes 52 may improve atomization of the liquid fuel droplets. The swirling air may enhance droplet formation and disperse droplets generally evenly throughout the premixer tube 52. As a result, efficiency of the turbine system 10 may be further improved.

As previously discussed, air may enter the premixer tubes 52 through perforations 58. These perforations 58 may be arranged in a series of concentric circles at different axial positions along the length of the premixer tubes 52. In certain embodiments, each concentric circle may have 24 perforations, where the diameter of each perforation is approximately 0.05 inches. The number and size of the perforations 58 may vary. For example, premixer tubes 52 may include large teardrop shaped perforations 77 configured to provide enhanced air penetration and mixing. In addition, intermediate sized slotted perforations 79 may be located toward the downstream end of premixer tubes 52 to generate a high degree of swirl. The perforations 58 may be angled along a plane perpendicular to the longitudinal axis of the premixer tube 52. The angled perforations 58 may induce swirl, the magnitude of which may be dependent on the angle of each perforation 58.

FIGS. 9, 10, and 11 are simplified cross-sectional views of the premixer tube 52 taken along lines 9-9, 10-10, and 11-11 of FIG. 8, further illustrating angled orientations of the perforations 58 at different axial positions along the length of the tube 52. For example, an angle 80 between perforations 58 and radial axis 81 is illustrated in FIG. 9. Similarly, an angle 82 between perforations 58 and radial axis 81 is illustrated in FIG. 10. Angles 80 and 82 may range between about 0 to 90 degrees, 0 to 60 degrees, 0 to 45 degrees, 0 to 30 degrees, or 0 to 15 degrees. By further example, the angles 80 and 82 may be about 5, 10, 15, 20, 25, 30, 35, 40, or 45 degrees, or any angle therebetween.

In certain embodiments, the angle of the perforations 58 may be the same at each axial location represented by lines 9-9, 10-10, and 11-11, as well as other axial positions along the length of the tube 52. However, in the illustrated embodiment, the angle of the perforations 58 may vary along the length of the tube 52. For example, the angle may gradually increase, decrease, alternate in direction, or a combination thereof. For example, the angle 80 of the perforations 58 shown in FIG. 9 is greater than the angle 82 of the perforations 58 shown in FIG. 10. Therefore, the degree of swirl induced by the perforations 58 in FIG. 9 may be greater than the degree of swirl induced by the perforations 58 in FIG. 10.

The degree of swirl may vary along the length of the perforated portion 74 of the premixer tube 52. The premixer tube 52 depicted in FIG. 8 has no swirl in the lower portion of the perforated section 74, a moderate amount of swirl in the middle portion, and a high degree of swirl in the upper portion. These degrees of swirl may be seen in FIGS. 11, 10 and 9, respectively. In this embodiment, the degree of swirl increases as fuel flows in the downstream direction through the premixer tube 52.

In other embodiments, the degree of swirl may decrease along the length of the premixer tube 52. In further embodiments, portions of the premixer tube 52 may swirl air in one direction, while other portions may swirl air in a substantially opposite direction. Similarly, the degree of swirl and the direction of swirl may both vary along the length of the premixer tube 52.

In yet another embodiment, air may be directed in both a radial and an axial direction. For example, the perforations 58 may form a compound angle within the premixer tube 52. In other words, perforations 58 may be angled in both a radial and axial direction. For example, the axial angle (i.e., angle between perforations 58 and longitudinal axis 84) may range between about 0 to 90 degrees, 0 to 60 degrees, 0 to 45 degrees, 0 to 30 degrees, or 0 to 15 degrees. By further example, the axial angle may be about 5, 10, 15, 20, 25, 30, 35, 40, or 45 degrees, or any angle therebetween. Compound-angled perforations 58 may induce air to both swirl in a plane perpendicular to the longitudinal axis of the premixer tube 52 and flow in an axial direction. Air may be directed either downstream or upstream of the fuel flow direction. A downstream flow may improve atomization, while an upstream flow may provide better mixing of the fuel and air. The magnitude and direction of the axial component of the airflow may vary based on axial position along the length of the premixer tube 52.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a fuel nozzle, comprising:
      a fuel injector configured to output a fuel flow;
      a premixer tube disposed about the fuel flow output from the fuel injector, wherein the premixer tube comprises a perforated portion and a non-perforated portion, and the non-perforated portion is downstream of the perforated portion; and
      a cap enclosing the fuel injector and the premixer tube, wherein the cap is configured to receive air, to direct the air to a downstream portion of the cap to facilitate cooling of a downstream portion of the fuel nozzle, and to direct the air used for cooling into an upstream portion of the premixer tube, and wherein the cap is configured to be disposed within a combustor casing.

2. The system of claim 1, wherein perforations of the perforated portion are configured to swirl air entering the premixer tube.

3. The system of claim 2, wherein a degree of swirl varies with axial position along the length of the premixer tube.

4. The system of claim 1, wherein the fuel injector is configured to inject a gas and an atomized liquid substantially simultaneously.

5. The system of claim 1, wherein the fuel nozzle comprises a plurality of fuel injectors and a plurality of premixer tubes.

6. The system of claim 1, comprising a combustor having the fuel nozzle.

7. The system of claim 6, comprising a turbine engine comprising a plurality of combustors.

8. The system of claim 1, wherein the cap comprises a plurality of windows positioned around a circumference of the cap to receive the air.

9. A system, comprising:
   a fuel nozzle, comprising:
      a fuel injector configured to output a fuel flow;
      a perforated premixer tube comprising perforations disposed about the fuel flow downstream of the fuel injector, wherein the perforations are angled to facilitate airflow into the perforated premixer tube in a swirling motion, and a degree of swirl varies based on an axial position of the perforations along a length of the perforated premixer tube; and
      a cap enclosing the fuel injector and the perforated premixer tube, wherein the cap is configured to receive air, to direct the air to a downstream portion of the cap to facilitate cooling of a downstream portion of the fuel nozzle, and to direct the air used for cooling into an upstream portion of the perforated premixer tube, and wherein the cap is configured to be disposed within a combustor casing.

10. The system of claim 9, wherein a first set of perforations at a first axial position is configured to swirl air in a substantially opposite direction from a second set of perforations at a second axial position along the length of the perforated premixer tube.

11. The system of claim 9, wherein perforations of the perforated premixer tube are oriented at an angle in an axial direction along a longitudinal axis of the perforated premixer tube.

12. The system of claim 9, wherein the fuel injector is configured to inject a gas, an atomized liquid, or a combination thereof.

13. The system of claim 9, wherein the perforated premixer tube comprises a perforated portion and a non-perforated portion, wherein the perforated portion is upstream of the non-perforated portion.

14. The system of claim 9, comprising a plurality of fuel injectors and a plurality of perforated premixer tubes.

15. The system of claim 9, wherein the cap comprises a plurality of windows positioned around a circumference of the cap to receive the air.

16. A system, comprising:
   a fuel nozzle, comprising:
      a plurality of fuel injectors;
      a plurality of perforated premixer tubes, wherein each fuel injector outputs a flow of fuel in a downstream direction into a perforated premixer tube at an upstream portion of the perforated premixer tube; and
      a cap comprising a plurality of air windows positioned around a circumference of the cap and leading to an internal cavity, wherein the plurality of perforated premixer tubes are disposed in the internal cavity, and the cap is configured to route air through the air windows to a downstream portion of the cap, through the internal cavity around the perforated premixer tubes at least partially in an upstream direction from a downstream portion to the upstream portion of the perforated premixer tubes, and into the premixer tubes at the upstream portion, wherein the upstream direction is generally opposite from the downstream direction of the flow of fuel, and wherein the cap is configured to be disposed within a combustor casing.

17. The system of claim 16, wherein the plurality of perforated premixer tubes comprise a perforated portion and a non-perforated portion, wherein the perforated portion is upstream of the non-perforated portion.

18. The system of claim 16, wherein each perforated premixer tube comprises perforations angled to swirl the air.

19. The system of claim 18, wherein a degree of the swirl varies with axial position along a length of each perforated premixer tube.

20. The system of claim 16, wherein the plurality of fuel injectors are configured to inject a gas and an atomized liquid substantially simultaneously.

* * * * *